United States Patent
Chauvin

(10) Patent No.: US 9,334,799 B2
(45) Date of Patent: May 10, 2016

(54) METHOD OF ESTIMATING THE INTENSITY OF THE KNOCKING OF AN INTERNAL COMBUSTION ENGINE BY INVERSION OF A WAVE EQUATION

(75) Inventor: Jonathan Chauvin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 1014 days.

(21) Appl. No.: 13/486,441

(22) Filed: Jun. 1, 2012

(65) Prior Publication Data

US 2012/0310513 A1    Dec. 6, 2012

(30) Foreign Application Priority Data

Jun. 1, 2011    (FR) ..................... 11 01685

(51) Int. Cl.
| | | |
|---|---|---|
| *G06F 17/14* | (2006.01) | |
| *F02D 28/00* | (2006.01) | |
| *F02B 77/08* | (2006.01) | |
| *F02P 5/152* | (2006.01) | |
| *G01L 23/22* | (2006.01) | |

(52) U.S. Cl.
CPC ............... *F02B 77/085* (2013.01); *F02P 5/152* (2013.01); *G01L 23/227* (2013.01); *Y02T 10/46* (2013.01)

(58) Field of Classification Search
CPC .... G02M 15/12; F02B 77/085; F02B 77/086; G01L 23/227; F02P 5/152; Y02T 10/46
USPC ................ 701/111, 115; 73/114.07; 123/494, 123/406.24, 406.37, 406.38, 406.39
See application file for complete search history.

(56) References Cited

U.S. PATENT DOCUMENTS

| | | | | |
|---|---|---|---|---|
| 5,373,448 A | * | 12/1994 | Katogi ................... | G01L 23/225 123/435 |
| 6,223,120 B1 | * | 4/2001 | Williams .............. | G01M 15/11 701/102 |
| 6,388,444 B1 | * | 5/2002 | Hahn .................... | G01M 15/11 123/406.24 |
| 6,456,927 B1 | * | 9/2002 | Frankowski .......... | G01L 23/225 123/406.21 |
| 6,614,396 B2 | * | 9/2003 | Pina ........................ | G01S 1/026 342/401 |
| 7,254,475 B1 | * | 8/2007 | Grai ...................... | F02D 35/021 701/111 |
| 7,594,423 B2 | * | 9/2009 | Padhi .................... | G01L 23/225 73/114.07 |
| 2002/0179053 A1 | * | 12/2002 | Kokubo ................ | F02D 35/027 123/406.33 |
| 2004/0162668 A1 | * | 8/2004 | Rawlinson ............ | G01L 23/225 701/111 |

(Continued)

*Primary Examiner* — Hieu T Vo
*Assistant Examiner* — Arnold Castro
(74) *Attorney, Agent, or Firm* — Fitch, Even, Tabin & Flannery LLP

(57) ABSTRACT

A method of real-time estimation of the intensity of the knocking of an internal combustion engine utilizing a vibratory sensor is disclosed which is useful for control of internal combustion. A vibratory signal representing vibrations of the engine is continuously acquired as a function of the crankshaft angle. A model of a wave equation propagating through the cylinder-head is constructed. The coefficients of a Fourier decomposition of the vibratory signal are determined in real time by inverting the dynamics of the wave equation model using an estimator. The energy contained in the signal is computed by summing the squares of the coefficients of the Fourier decomposition. A parameter correlated with the intensity of knocking equal to the square root of the maximum of the energy is determined in real time.

30 Claims, 2 Drawing Sheets

(56) References Cited

U.S. PATENT DOCUMENTS

| | | | |
|---|---|---|---|
| 2004/0236494 A1* | 11/2004 | DeBotton | G01M 15/12 701/111 |
| 2006/0288767 A1* | 12/2006 | Hernandez | B60W 50/0205 73/114.12 |
| 2008/0051975 A1* | 2/2008 | Ker | F02D 35/02 701/102 |
| 2009/0030593 A1* | 1/2009 | Chauvin | G01M 15/12 701/111 |
| 2009/0277247 A1* | 11/2009 | Hagari | G01L 23/225 73/35.04 |
| 2009/0287398 A1* | 11/2009 | Saito | F02D 35/027 701/111 |
| 2010/0168991 A1* | 7/2010 | Hamama | F02D 35/027 701/111 |
| 2011/0118960 A1* | 5/2011 | Komatsu | F02D 35/027 701/111 |
| 2011/0153182 A1* | 6/2011 | Sasaki | F02D 35/027 701/111 |
| 2011/0178750 A1* | 7/2011 | Kitamura | G01L 23/225 702/76 |
| 2012/0150414 A1* | 6/2012 | Huang | F02D 35/024 701/101 |
| 2012/0316761 A1* | 12/2012 | Buslepp | F02D 35/023 701/111 |

* cited by examiner

METHOD OF ESTIMATING THE INTENSITY OF THE KNOCKING OF AN INTERNAL COMBUSTION ENGINE BY INVERSION OF A WAVE EQUATION

CROSS-REFERENCE TO RELATED APPLICATION

Reference is made to French Patent Application 11/01.685, filed Jun. 1, 2011, which application is incorporated herein by reference in its entirety.

BACKGROUND OF THE INVENTION

1. Field of the Invention

The present invention relates to the control of the combustion of an internal combustion engine and particularly to a method of estimating the intensity of knocking of the engine with a sensor placed in the engine.

2. Description of the Prior Art

The engine comprises at least one cylinder comprising a combustion chamber within each cylinder having an internal lateral wall, pistons with a top which slides in the cylinders and a cylinder-head. Generally, a carbureted mixture is enclosed in the combustion chamber and undergoes a step of compression followed by a step of combustion under the effect of controlled ignition using a spark plug. These steps are grouped together under the term "combustion phase" in the subsequent description.

In a combustion engine, the burning of the air/gasoline mixture normally begins after the spark. The flame front propagates and its blast thrusts a part of the mixture against the walls of the cylinder and the top of the piston. The rise in pressure and in temperature becomes so great that the fuel ramming against the walls attains its self-ignition point and bursts into flame in several places. This phenomenon is called "knocking". Thus knocking, is above all, a phenomenon of abnormal combustion in controlled-ignition engines and is perceptible externally as a metallic noise coming from the engine. It results from the occurrence of shock waves in the combustion chamber.

The micro explosions which result therefrom produce vibrations in the acoustic domain (on the order of 5 to 20 KHz). They are very vigorous and can rapidly create hot spots which will accentuate the problem still more. The accumulation of micro explosions will cause a small amount of metal to be torn away or to melt on the top of the piston and/or on the walls of the cylinder and rings. After some time (depending on the intensity) this will lead to the destruction of the piston, the rings or the walls of the cylinder.

The estimation of the intensity of knocking allows controlling of the combustion, limiting the effect of the knocking and not damaging the cylinder.

Methods of estimating the knocking of an internal combustion engine are known. They are based on the recording of signals arising from a cylinder pressure sensor. A first method applies off-line, that is to say during subsequent processing, a technique of Fourier transformations of the recorded signals to estimate the knocking. Such a method is described in the following documents:

"*Application of the Reallocated Smoothed Pseudo Wigner-Ville Distribution to Knock Detection*", Olivier BOUBAL and Jacques OKSMAN, *Traitement du Signal* volume 15, 1998

"*Knock Measurement for Fuel Evaluation in Spark Ignition Engines*", C. Hudson, X. Gao, R. Stone, *Fuel volume* 80 (2001)

A second method applies a technique of filtering and of detecting a maximum of the signals to estimate the knocking off-line. Such a method is described in the following document:

"*Modeling of In-cylinder Pressure Oscillations under Knocking Conditions: Introduction to Pressure Envelope Curve*", G. Brecq and O. Le Corre, *SAE* 2005

Finally, another method is known, also based on the recording of signals arising from a cylinder pressure sensor. This time, a wavelet technique is applied to the signals to estimate the knocking off-line. Such a method is described in the following document:

"*Knocking Detection Using Wavelet Instantaneous Correlation Method*", Z. Zhang and, E. Tomita, *Journal of SAE Review* volume 23 (2002)

However, these methods do not allow estimation of the intensity of the knocking in real time (the computation must typically be done in less than 50 µs in order to be performed onboard by a computer).

French Patent application 2,949,511 discloses a method of estimating in real time the intensity of knocking, with a vibratory signal. According to this method, the coefficients of the Fourier decomposition of this signal are determined in real time and the energy contained in the signal is determined therefrom by summing the squares of these coefficients of the Fourier decomposition. Finally, the intensity of knocking is estimated by determining a parameter correlated with the intensity of knocking equal to the square root of the maximum of the energy.

SUMMARY OF THE INVENTION

The subject of the invention relates to an alternative method of determining in real time the intensity of the knocking in an internal combustion engine. The method is based on processing a vibratory signal representative of the vibrations of the engine. The invention makes it possible to increase the representativity, based on modeling the cylinder-head by a wave equation which propagates the source vibratory signal, followed by an estimation of the Fourier coefficients of the source signal.

The estimation is carried out in real time so as to best control the combustion and safeguard the engine.

Generally, the invention relates to a method of estimating in real time the intensity of knocking of an internal combustion engine comprising a cylinder-head, at least one cylinder and at least one vibratory sensor, by using a vibratory signal representative of the vibrations in the cylinder which is acquired at an output of the cylinder-head continuously and as a function of the crankshaft angle. The method comprises the following steps:

constructing a wave equation model of the cylinder-head based on a physical model describing the propagation of a wave in a solid medium;

determining coefficients of the Fourier decomposition of the vibratory signal in real time by inverting the dynamics of the wave equation model by raising an estimator;

computing energy contained in the signal by summing the squares of the coefficients of the Fourier decomposition; and correlating a parameter with the intensity of knocking equal to the square root of the maximum of energy which is determined in real time.

According to the invention, the vibratory signal may be a signal arising from a cylinder pressure sensor or a signal arising from an accelerometric sensor.

This vibratory signal can comprise several harmonics and it is then possible to estimate the coefficients of the Fourier decomposition solely for the harmonic or the harmonics correlated with the combustion. In this case, it is possible to select the harmonics correlated with the combustion by carrying out a spectral analysis or a time/frequency analysis, or by choosing the 5000 Hz-20000 Hz frequency band.

According to one embodiment, an angular span is determined which includes the whole of the combustion-related vibratory response, and the vibratory signal is restricted to the angular span before carrying out the filtering.

The estimator may be an adaptive type non-linear estimator.

According to the invention, it is possible to modify engine parameters as a function of the parameter correlated with the intensity of knocking for controlling the combustion of the engine.

Other characteristics and advantages of the method according to the invention, will become apparent on reading the description hereinafter of nonlimiting exemplary embodiments, while referring to the appended drawings which are described hereinafter.

DETAILED DESCRIPTION OF THE INVENTION

The method according to the invention is for controlling the combustion of an internal combustion engine taking into account the phenomena of knocking. The method comprises the estimation of the intensity of knocking of the engine, on a basis of processing a signal obtained from a sensor. The signal has a physical meaning which directly portrays the combustion and the possible occurrence of knocking. The method is independent of the nature of the combustion and of the technology of the cylinder pressure sensor being used.

The invention is described according to a particular embodiment, in which the method is described with reference to a single cylinder, without integrating particular features associated with the mode of combustion of the engine. According to this exemplary embodiment, a cylinder pressure sensor is used. The nature of the internal combustion engine, as well as the technology of the cylinder pressure sensor which is used, does not change the principle of the method.

Figure 1:
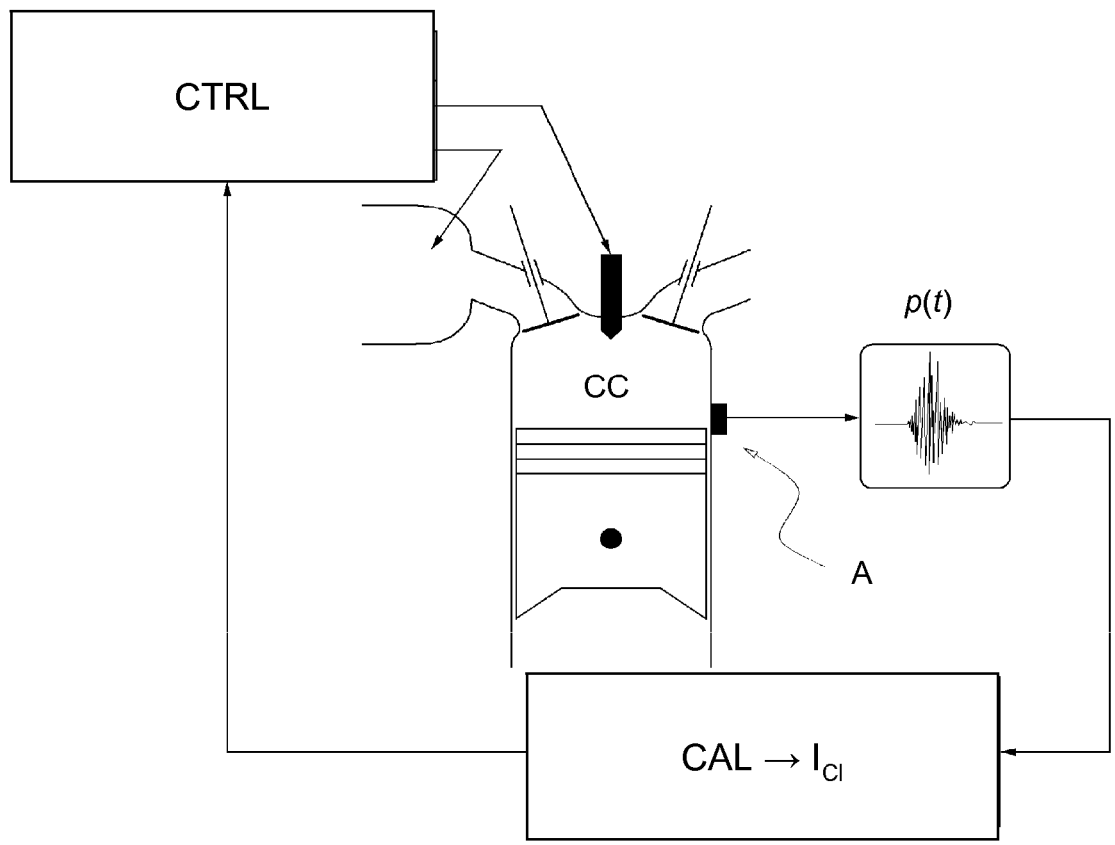
FIG. 1 shows the diagram of the principle of the control of combustion according to the invention.

FIG. 1 illustrates the general principle of the method of control according to the invention. Initially a cylinder pressure signal (p(t)) is acquired, arising from a cylinder pressure sensor (A). This pressure signal corresponds to combustion in the combustion chamber (CC). It is known that only certain harmonics of this signal contain information portraying knocking. The method is therefore to compute the various harmonics of the vibratory signal in real time, and then to select those which correspond to combustion. Finally, on the basis of the harmonics containing information about combustion, the intensity of knocking ($I_{Cl}$) directly portraying combustion is computed (CAL), while in real time which allows the adjustment (CTRL) of the parameters of the engine to regulate the combustion.

Figure 2:
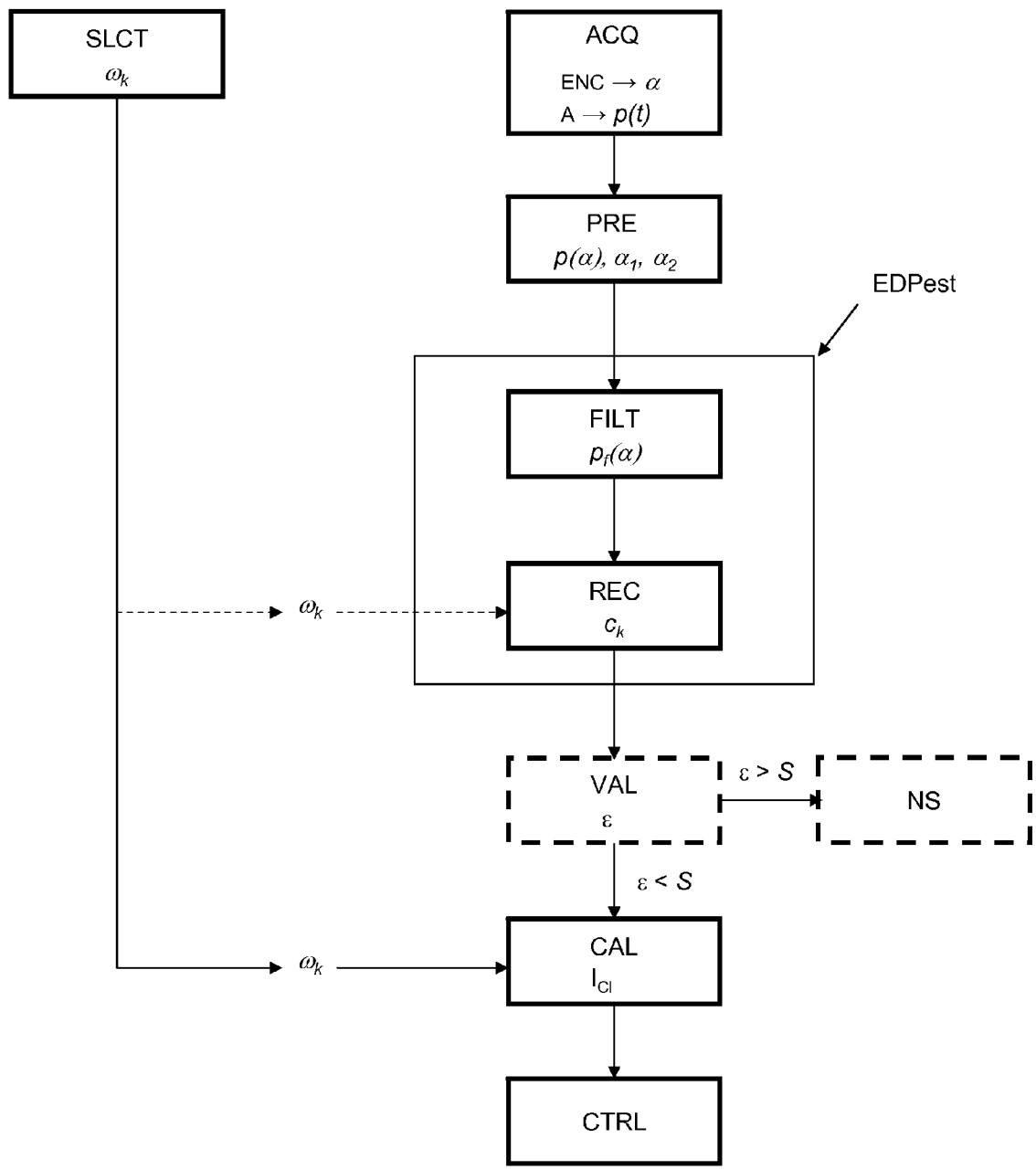
FIG. 2 shows a functional diagram decomposing the estimation of the intensity of the knocking via the parameter $I_{Cl}$.

As illustrated by FIG. 2, the method of engine control of combustion can be decomposed into five main steps:

Preliminary step:
Step 1—Selection of the harmonics representing combustion (SLCT) Steps carried out in real time:
Step 2—Acquisition of a signal from a cylinder pressure sensor (ACQ)
Step 3—Determination in real time of the harmonics of the signal (PDEest)
Step 4—Determination in real time of the intensity of the knocking to directly represent combustion (CAL)
Step 5—Engine control: Adjustment of the parameters of the engine so as to regulate combustion and avoid knocking (CTRL)

Step 1: Selection of the Harmonics Representing Combustion (SLCT)

Any periodic oscillating quantity (or alternately increasing and decreasing quantity), such as the cylinder pressure signal (or the signal arising from an accelerometric sensor), may be considered to be the sum of sinusoidal components whose frequencies are integer multiples of the fundamental frequency. The latter, also called the ground frequency, is equal to the inverse of the period of the quantity under consideration. The multiple frequencies are sinusoidal components whose frequency is an integer multiple of the fundamental frequency. These multiple frequencies are called the harmonics.

Each of the harmonics bear one or more items of information: noise, combustion, chatter of the injectors, reversing of the piston at the top dead center, vibrations induced by the distribution system, etc.

The objective is, initially, to select, from among these components, those which contain information representing combustion. This operation amounts to extracting the useful part of the signal arising from the cylinder pressure sensor while circumventing spurious phenomena.

To determine the harmonics which make it possible to represent the combustion, two methods may be proposed which are time/frequency analysis or spectral analysis. These methods are applied to signals arising from cylinder pressure sensors within experiments prior to implementation of the steps controlling the combustion of the engine in real time.

The time/frequency analysis of the signal may be interpreted as a sliding window in which a fast Fourier transform (FFT) is performed, which is well known, at each time step. This form of Fourier transform is also known as the short-time Fourier transform, and its representation in the frequency time plane is given by a spectrogram. A spectrogram is a chart associating with each instant t of a signal, the frequency spectrum thereof. In its most common format, the horizontal axis represents the time and the vertical axis the frequency. Each point inside the graph containing a certain intensity which indicates the amplitude (often in decibels) of a particular frequency at a given time. In the automobile industry, it is common to replace the time axis by an angle axis, corresponds to the value of the crankshaft angle. For such a spectrogram, the periodicity of the combustions appears clearly on the angle axis. These events correspond to periodic phenomena which are synchronous with the events occurring during an engine cycle, part of which is combustion-related. Conventionally, within the framework of analyzing vibratory signals arising from the cylinder pressure sensor placed in an internal combustion engine, zones of angular spreading are clearly distinguished in certain frequency bands between 5 kHz and 20 kHz. Indeed, between a signal with knocking and a signal without knocking, a very great difference is observed in the energy in the zones of frequencies of a few kHz (usually between 7 and 9, this is why the filter is extended between 5 and 20). This frequency depends mainly on the geometry of the model. This frequency is obtained experimentally by carrying out a few measurements on the combustion system.

Thus, according to the method, it is possible either to fix the frequency band of interest for portraying combustion between 5 kHz and 20 kHz, or to determine, as a function of the type of engine for example, the appropriate frequency band with the aid of a spectral analysis.

In the subsequent description, the 5 kHz-20 kHz frequency band is employed in order to estimate the intensity of knocking.

The signal harmonics (frequency components) selected are denoted: $\omega_k$ with $k \in [1, n_h]$. The integer $n_h$ is chosen in such a way that these $n_h$ harmonics belong to the 5 kHz-20 kHz frequency band.

Steps 2 to 5 are carried out in real time.

Step 2: Acquisition of a Signal Arising from a Vibration Sensor (ACQ)

The method of controlling combustion relies on the processing of a vibratory signal, having a physical meaning which directly represents combustion and the possible occurrence of knocking. This signal is delivered continuously by a sensor which is a cylinder pressure sensor according to the exemplary embodiment of the invention. This type of acquisition is well known. The technology of the cylinder pressure sensor which is used does not influence the principle of the method either. The signal acquired by the cylinder pressure sensor (A) is denoted p(t). The variable t represents time.

The signal delivered by the cylinder pressure sensor, p(t), constitutes one of the two inputs of the processing chain. The second signal, $\alpha(t)$, is a signal providing the value of the crankshaft angle as a function of time. The crankshaft angle is denoted a. This signal is delivered by an angular coder (ENC).

Step 3: Determination in Real Time of the Harmonics of the Signal

The objective is, initially, to estimate in real time all the harmonic components of the vibratory signal arising from the cylinder pressure sensor, or at the very least, the useful harmonic components selected in step 1. The fact of reconstructing these components in real time signifies that a signal is not recorded continuously in order to process it subsequently in order to obtain the harmonic components, through a Fourier decomposition for example. On the contrary, these components are estimated as the signal is measured. For this purpose, a Fourier PDE (Partial Differential Equation) observer is used. The method can comprise the following steps:

Extraction of the useful part of the signal: preprocessing of the vibratory signal (PRE)

Estimation of the harmonics by a Fourier PDE observer (PDEest)

Extraction of the Useful Part of the Signal: Preprocessing of the Vibratory Signal (PRE)

The processing of the signal from the cylinder pressure sensor constitutes a very significant element in the engine control chain since it delivers variables utilizable for the loop control of combustion. The first step processes the vibratory signal to obtain a maximum of useful information. This preprocessing (before the reconstruction of the harmonics and combustion parameters) to extract the useful part of the vibratory signal can comprise the following steps: sampling of p(t) in the angular domain which determination of an angular window occurs which includes combustion.

Sampling of p(t) in the Angular Domain

The signal p(t) is sampled in the angular domain. This signal is then denoted $p(\alpha)$. The angular domain is, as opposed to the temporal domain, the domain in which all the data are expressed as a function of the crankshaft angle. This step makes it possible to work in an invariant reference frame as for all rotating machines. The second benefit of working in the angular domain stems from the fact that the advance in the ignition is controlled in an angular manner, with respect to the top dead center (TDC), thereby facilitating the control of the advance for combustion. But it is obviously necessary to be certain of the proper setting of the angular encoder which defines the origin of the reference frame in the angular domain as being the top dead center.

Determination of an Angular Window $[\alpha_1; \alpha_2]$ which Includes Combustion The signal p(t) is measured continuously by an acquisition card, and then transformed into the angular domain ($p(\alpha)$). However, the subsequent processing is advantageously performed solely on an angular span bounded by angles $\alpha_1$ and $\alpha_2$. These two parameters form part of the knocking observer (Fourier observer according to the invention) calibration elements. The limits $\alpha_1$ and $\alpha_2$ depend on the angular span of occurrence of combustion. The latter may be early (several degrees before the TDC) or, conversely, extremely late (20 degrees after the TDC) depending on the mode of combustion. For a given engine, the limits $\alpha_1$ and $\alpha_2$ must be chosen so as to include the whole of the vibratory response of the combustion, over the entire operating span of the engine. These angles are defined with respect to the top dead center which represents the origin of the reference frame. Therefore, the angle $\alpha_1$ is of negative sign and $\alpha_2$ of positive sign.

To sum up, the method processes the vibratory signal over a determined time window of the signal from the sensor, whose position corresponds to a determined angular position of the crankshaft of the engine. The signal of the sensor containing, inside this time window or the corresponding angular window $[\alpha_1; \alpha_2]$, information relating to the vibratory behavior of the engine, making it possible to determine combustion parameters for assessing quality of combustion.

Estimation of the Harmonics by a PDE Fourier Observer (PDEest)

i. Construction of a Model of Wave Equation Through the Cylinder-Head

The signal that is measured is a vibratory signal representative of the vibrations within the cylinder. These vibrations propagate through the cylinder-head of the engine. The vibration at the exit of the cylinder-head is measured and an attempt is made to reconstruct the signal entering the cylinder-head. On passing through the cylinder-head, the signal is modified because of the propagation of the waves in metal. Thus, a model which makes it possible to transform the vibratory signal entering the cylinder-head into the vibratory signal measured on the cylinder-head is called a cylinder-head wave equation model.

The goal is to estimate, on the basis of the cylinder-head wave equation model and of the measurement y (equal to $p_c(\alpha)$), the signal $\omega$, which is the reconstruction of the vibratory signal from the engine $p(\alpha)$ with the useful frequencies (containing the information relating to combustion). In the course of the method according to the invention, signal $\omega$ is characterized by parameters that are quasi-invariant over time, thus making it possible to carry out this estimation in real time. Stated otherwise, the signal $\omega$ is defined with the aid of parameters which, at a given instant, are constants. For this purpose, the fact that the signal $\omega$ is mechanically periodic is exploited. Thus, instead of carrying out an estimation of the highly variable signal $\omega$, it is possible to estimate the coefficients of the Fourier decomposition of this signal. It is also possible to use any parameters which make possible the description of the signal $\omega$ in relation to its periodic character.

The decomposition of the signal ω into Fourier coefficients, expanded in complex form for the sake of clarity, may thus be written:

$$\omega(\alpha) = \sum_{k=1}^{n_h} c_k e^{(i\omega_k \alpha)} \quad (2)$$

The parameters $c_k$ represent the Fourier coefficients of the decomposition of the signal ω. A signal conveying the vibratory signal is thus defined as a function of the time-invariant parameters $c_k$.

The equation, which is known, for the propagation of a wave in a medium may be written:

$$\begin{cases} \partial_{\alpha\alpha} u = a\partial_{xx} u - b\partial_\alpha u \\ \partial_x u(L, \alpha) = -qu(L, \alpha) \end{cases}$$

with
- a being the wave propagation speed coefficient
- b being the friction coefficient
- q being the reflection coefficient
- L being the distance between the sensor and the source
- x being the spatial location
- t being the time
- u being the signal measuring the wave. u(x, t) is the amplitude of the wave at the point x at the time t. Thus $u(0,t) = \omega(\alpha)$.

The coefficients a, b and q depend on the medium. According to the invention these parameters are chosen for a medium representing the cylinder-head, namely a solid medium such as metal.

By using only a finite number of harmonics, and on the basis of the equation for the propagation of a wave in a metal, the model representing the cylinder-head wave equation model in real time may then be written:

$$\begin{cases} \partial_{\alpha\alpha} u = a\partial_{xx} u - b\partial_\alpha u \\ \partial_x u(L, \alpha) = -qu(L, \alpha) \\ u(0, t) = \omega(\alpha) = \sum_{k=1}^{n_h} c_k e^{(i\omega_k \alpha)} \\ \dot{c}_k = 0, \text{ for all } k \in [1, n_h] \end{cases} \quad (3)$$

According to the invention, the goal is to estimate the Fourier coefficients ($c_k$) of the decomposition of the signal ω.

The system of equations (3) represents the cylinder-head wave equation model. It makes it possible to characterize the signal ω by parameters that are quasi-invariant over time (REC).

ii. Determination in Real Time of the Coefficients of the Fourier Decomposition

For this purpose, the dynamics of the wave equation model (3) are inverted with the aid of an estimator, by coupling this model with a non-linear estimator of an adaptive type employing partial derivatives.

It is desired to define an estimator, called a "Fourier PDE observer", to reconstruct the periodic excitation of the accelerometric signal on the basis of its filtered measurement $p_f(\alpha)$. This filtering step is denoted FILT in FIG. 2. For this purpose, a bandpass filter (between 1 kHz and 100 kHz) is used to remove the very low frequencies and the very high frequencies.

On the basis of the model described by system (3), a non-linear estimator of the adaptive type is defined comprising on the one hand, a term related to the dynamics and on the other hand, a correction term expressed as follows:

$$\begin{cases} \partial_{\alpha\alpha} \hat{u} = a\partial_{xx} \hat{u} - b\partial_\alpha \hat{u} + \Phi_0(x)(y(\alpha) - \hat{u}(L, \alpha)) + (\Phi_1(x) + b\Phi_0(x))(\dot{y}(\alpha) - \dot{\hat{u}}(L, \alpha)) \\ \partial_x u(L, \alpha) = -qu(L, \alpha) - p_0(\dot{y}(\alpha) - \dot{\hat{u}}(L, \alpha)) + \phi_0(y(\alpha) - \hat{u}(L, \alpha)) \\ u(0, t) = \omega(\alpha) = \sum_{k=1}^{n_h} \hat{c}_k e^{(i\omega_k \alpha)} \\ \dot{\hat{c}}_k = -\phi_k(\alpha)'(y(\alpha) - \hat{u}(L, \alpha)), \text{ for all } k \in [1, n_h] \end{cases} \quad (4)$$

where:
- the sign ' designates the complex conjugate
- $\hat{u}$ is the estimated value of u
- $\hat{c}_k$ is the estimated value of ck
- $p_0$ is a coefficient to be calibrated (positive real)

A choice of the parameters $\phi_0(x)$, $\phi_1(x)$ and $\phi_k(\alpha)$ must ensure the convergence of the estimator (observer). For this purpose, the following function is defined first:

$$\phi(x, y) = \frac{\cosh\left(x\sqrt{\frac{by + y^2}{a}}\right) + \frac{yp_0}{\sqrt{\frac{by + y^2}{a}}} \sinh\left(x\sqrt{\frac{by + y^2}{a}}\right)}{\cosh\left(L\sqrt{\frac{by + y^2}{a}}\right) + \frac{yp_0}{\sqrt{\frac{by + y^2}{a}}} \sinh\left(L\sqrt{\frac{by + y^2}{a}}\right)}$$

and then $$\Phi_1(x) = \lambda \sum_{k=-n_h}^{n_h} \frac{1}{k^2 + 1} \phi(L - x, ik\omega_0) \phi(L, ik\omega_0)'$$

$$\Phi_0(x) = \lambda \sum_{k=-n_h}^{n_h} \frac{ik\omega_0}{k^2 + 1} \phi(L - x, ik\omega_0) \phi(L, ik\omega_0)'$$

$$\phi_k(\alpha) = \frac{\lambda}{k^2 + 1} e^{ik\omega_0 \alpha} \phi(L, ik\omega_0)$$

$$\phi_0 = p_0 \Phi_1(L)$$

The system of equations (4) represents a non-linear estimator of the adaptive type which makes possible the estimation of the coefficients $c_k$ of the decomposition of the signal ω into Fourier coefficients.

This method ensures the reconstruction of the excitation through the coefficients $c_k$. The reconstructed accelerometric signal $\hat{\omega}$ is expressed by the following relation:

$$\hat{\omega}(\alpha) = \Sigma \hat{c}_k(\alpha) e^{iw_k \alpha}$$

Therefore: $\hat{y} = C\hat{x} = \hat{p}_f(\alpha)$

Choosing the Harmonics

The case has been considered where the harmonics chosen in step 1 ($\omega_k$) were used to reconstruct the signal with k varying between $-n_h$, and $n_h$, and therefore $n_h$ harmonics are used, which carry information representing the combustion.

However, the estimation $\hat{\omega}(\alpha)$ of the excitation may be carried out on the basis of a greater number of harmonics. Indeed, the more Fourier coefficients are used, the more accurate is the reconstruction of the excitation w. It would not be a departure from the invention to choose a different number of harmonics ($n_h$) from the number of harmonics selected in step 1. On the other hand, it is obvious that the larger the number of harmonics which are chosen to reconstruct the excitation w, the greater the computation time. It is therefore necessary to make a compromise between speed of computation and accuracy.

The objective is therefore to determine at one and the same time the relevant values $\omega_k$ and also the adapted parameter $n_h$, which is the choice of the number of harmonics required for the reconstruction of the signal. This choice depends on the respective energies of the various harmonics. In general, the first three harmonics are the most significant for representing the combustion and they are sufficient to reconstruct the excitation. In most cases $n_h = 1$. The signal that is reconstructed is denoted $\hat{p}(\alpha)$.

Example of Calibrating the Observer.

Table 1, where $N_{cyl}$ represents the number of cylinders of the engine, presents examples of values of the parameters required for calibrating the Fourier observer.

TABLE 1

Summary of the parameters of adjustments selected for the trial engine.

| Parameter | Unit | Description | Value |
|---|---|---|---|
| $\alpha_1$ | degree | lower bound of the angular window | 0 |
| $\alpha_2$ | degree | upper bound of the angular window | 80 |
| $F_1$ | hertz | low cutoff frequency of the bandpass filter | 5000 |
| $F_2$ | hertz | high cutoff frequency of the bandpass filter | 20000 |
| $n_h$ | — | number of Fourier coefficients required for the reconstruction of the signal | 1 |
| $\Lambda$ | — | Gain of the observer | .1 |
| $P_0$ | — | Gain of the observer | $\frac{1}{2}$ |
| $w_1$ | hertz | angular frequency of the first harmonic | 7500 |

Verification of the Quality of the Estimation (VAL)

In order to avoid dispatching erroneous parameters to the engine control, an optional step makes it possible to validate the relevance of the reconstruction of the vibratory signal. A threshold on the square of the error signal (difference between the measurement and the estimate) ensures this function.

$$\epsilon = (y - \hat{y})^2$$

If this threshold $\epsilon$ is too great, above a fixed threshold S, the dispatching of parameters to the engine control is not carried out (NS). Otherwise, step 4 (CAL) is carried out.

Step 4: Determination of Parameters to Directly Represented the Intensity of Knocking (CAL)

As soon as the estimation of the frequency components of the vibratory signal is validated, the engine control operation may be conducted. The looped control under transient conditions of combustion requires the real-time estimation of parameter correlated with the intensity of knocking, to achieve cycle by cycle control.

The invention uses the real-time estimation of a parameter, denoted $I_{CI}$, which makes possible characterizing the intensity of the knocking in the cylinder of an engine.

In a preferential manner, the computation of this parameter relies on the analysis of the energy contained in the selected harmonics (spectral components). The energy $E(\alpha)$ is given by the sum of the first nh coefficients of the Fourier decomposition that are delivered by the periodic observer and squared:

$$E(\alpha) = E(c_k(\alpha))^2$$

Based on this energy, a physical meaning is given to the parameter $I_{CI}$, since the energy $E(\alpha)$ increases with the energy released during combustion.

It is for example possible to define the following parameter, whose value is representative of the intensity of knocking:

$$I_{CI} = (\max_{\alpha \in [\alpha_1, \alpha_2]}(E(\alpha)))^2$$

Step 5: Engine Control of Combustion (CTRL)

The implementation of a closed-loop control strategy is possible based on this parameter $I_{CI}$. The intensity parameter is used to compensate for the variations of the characteristics of the fuel or cylinder to cylinder imbalances. By way of example, the following is a description of a control strategy based on the parameter $I_{CI}$.

Adjustment of the Ignition Timing.

The timing of the ignition is a paramount component since it comes into consideration in the optimization of the efficiency of the combustion and pollution emissions. In this specific case, Ici is an ideal candidate for representing a looping of the ignition advance which does not exceed an intensity resulting in engine impairment or destruction.

Indeed, the more that ignition is delayed, the greater the probability of knocking. Therefore, the ignition advance is controlled with a proportional integral controller, to control the knocking around a reference level which allows good production of torque and prevents engine damage. This reference value may be determined experimentally since it depends on the engine and the geometry of the cylinder.

Variants

The invention has been described using a cylinder pressure sensor. It would not be a departure from the invention to use any other sensor capable of providing a signal correlated with the vibrations of the cylinder.

It is for example possible to use the signal arising from an accelerometric sensor. Indeed, such a signal corresponds to a periodic oscillating quantity and may therefore be considered to be the sum of sinusoidal components whose frequencies are integer multiples of the fundamental frequency. This acceleration signal a(t) corresponds to the vibration of the engine block which is highly correlated with combustion.

By applying the same processing as the cylinder pressure signal, it is possible to estimate the intensity of knocking by means of $I_{CI}$.

Advantages of the Invention

The method of the invention has the advantage, in contrast to the earlier methods, of obtaining in real time an estimation of the intensity of the knocking. Thus, on completion of an engine cycle, the knocking parameter (Ici) is available, and makes it possible to carry out a diagnosis of the elapsed cycle. As a function of this diagnosis, if the intensity is judged too high, the ignition parameters are modified so as to guarantee the stability of the following combustion and its conformity with respect to the reference point. It is to be noted that the frequency analysis of a signal may turn out to be costly in terms of computation time and inappropriate for real-time processing. Here, the method is both accurate and fast.

Moreover, the method according to the invention does not depend on the nature of the combustion or the technology of the sensor that is used. The adjustment parameters ensure good adaptability of the method to diverse engine/sensor configurations.

The use of a model of a wave equation propagating through the cylinder-head allows this procedure to be closer to physical reality than the earlier methods.

The invention claimed is:

1. A method of estimating and controlling in real time intensity of knocking of an internal combustion engine comprising a cylinder-head, at least one cylinder and at least one vibration sensor providing a continuous vibration signal representative of vibrations in the at least one cylinder at an output of the cylinder-head which signal is a function of the crankshaft angle, comprising:
    constructing a wave equation model of the cylinder-head based on a physical model describing propagation of waves in a solid medium;
    determining coefficients of a Fourier decomposition of the vibration signal in real time by inverting dynamics of the wave equation model with an estimator;
    computing energy contained in the vibration signal by summing squares of the coefficients of the Fourier decomposition;
    determining in real time a parameter correlated with intensity of knocking equal to a square root of a maximum of the energy; and
    using the real time parameter correlated with intensity of knocking in controlling the combustion of the internal combustion engine to control the intensity of knocking in real time.

2. A method according to claim 1, wherein the vibration signal is obtained from a cylinder pressure sensor or from an accelerometric sensor.

3. A method according to claim 1, in which the vibration signal comprises harmonics and the coefficients of the Fourier decomposition are estimated solely for at least one harmonic correlated with combustion.

4. A method according to claim 2, in which the vibration signal comprises harmonics and the coefficients of the Fourier decomposition are estimated solely for at least one harmonic correlated with combustion.

5. A method according to claim 3, where the at least one harmonic correlated with combustion is selected from one of a spectral analysis, a time/frequency analysis, or from a 5000 Hz-20000 Hz frequency band of the vibration signal.

6. A method according to claim 4, where the at least one harmonic
    correlated with combustion is selected from one of a spectral analysis, a time/frequency analysis, or from a 5000 Hz-20000 Hz frequency band of the vibration signal.

7. A method according to claim 1, wherein an angular range of the crank shaft angle is determined which includes all of a combustion-related vibratory response, and the vibration signal is restricted to the angular range before filtering the vibration signal.

8. A method according to claim 2, wherein an angular range of the crank shaft angle is determined which includes all of a combustion-related vibratory response, and the vibration signal is restricted to the angular range before filtering the vibration signal.

9. A method according to claim 3, wherein an angular range of the crank shaft angle is determined which includes all of a combustion-related vibratory response, and the vibration signal is restricted to the angular range before filtering the vibration signal.

10. A method according to claim 4, wherein an angular range of the crank shaft angle is determined which includes all of a combustion-related vibratory response, and the vibration signal is restricted to the angular range before filtering the vibration signal.

11. A method according to claim 5, wherein an angular range of the crank shaft angle is determined which includes all of a combustion-related vibratory response, and the vibration signal is restricted to the angular range before filtering the vibration signal.

12. A method according to claim 6, wherein an angular range of the crank shaft angle is determined which includes all of a combustion-related vibratory response, and the vibration signal is restricted to the angular range before filtering the vibration signal.

13. A method according to claim 1, in which the estimator is an adaptive non-linear estimator.

14. A method according to claim 2, in which the estimator is an adaptive non-linear estimator.

15. A method according to claim 3, in which the estimator is an adaptive non-linear estimator.

16. A method according to claim 4, in which the estimator is an adaptive non-linear estimator.

17. A method according to claim 5, in which the estimator is an adaptive non-linear estimator.

18. A method according to claim 6, in which the estimator is an adaptive non-linear estimator.

19. A method according to claim 7, in which the estimator is an adaptive non-linear estimator.

20. A method according to claim 8, in which the estimator is an adaptive non-linear estimator.

21. A method according to claim 9, in which the estimator is an adaptive non-linear estimator.

22. A method according to claim 10, in which the estimator is an adaptive non-linear estimator.

23. A method according to claim 11, in which the estimator is an adaptive non-linear estimator.

24. A method according to claim 12, in which the estimator is an adaptive non-linear estimator.

25. A method according to claim 1, wherein engine parameters are modified as a function of the parameter correlated with the intensity of knocking to control the combustion of the engine.

26. A method according to claim 2, wherein engine parameters are modified as a function of the parameter correlated with the intensity of knocking to control the combustion of the engine.

27. A method according to claim 3, wherein engine parameters are modified as a function of the parameter correlated with the intensity of knocking to control the combustion of the engine.

28. A method according to claim 5, wherein engine parameters are modified as a function of the parameter correlated with the intensity of knocking to control the combustion of the engine.

29. A method according to claim 7, wherein engine parameters are modified as a function of the parameter correlated with the intensity of knocking to control the combustion of the engine.

30. A method according to claim 13, wherein engine parameters are modified as a function of the parameter correlated with the intensity of knocking to control the combustion of the engine.

* * * * *